United States Patent
Circello et al.

(10) Patent No.: US 6,192,449 B1
(45) Date of Patent: *Feb. 20, 2001

(54) APPARATUS AND METHOD FOR OPTIMIZING PERFORMANCE OF A CACHE MEMORY IN A DATA PROCESSING SYSTEM

(75) Inventors: Joseph C. Circello, Phoenix, AZ (US); Anup S. Tirumala; Vasudev J. Bibikar, both of Austin, TX (US)

(73) Assignee: Motorola, Inc., Schaumburg, IL (US)

( * ) Notice: Under 35 U.S.C. 154(b), the term of this patent shall be extended for 0 days.

This patent is subject to a terminal disclaimer.

(21) Appl. No.: 08/629,930

(22) Filed: Apr. 12, 1996

(51) Int. Cl.[7] .................................................. G06F 12/00
(52) U.S. Cl. ...................... 711/133; 711/113; 711/118; 711/122; 711/134; 711/136
(58) Field of Search ..................... 711/133, 134, 711/136, 141, 142, 143, 125, 126, 122, 118, 3

(56) References Cited

U.S. PATENT DOCUMENTS

| | | | |
|---|---|---|---|
| 5,067,078 | 11/1991 | Talgam et al. | 711/3 |
| 5,375,216 | 12/1994 | Moyer et al. | 711/123 |
| 5,410,669 | 4/1995 | Biggs et al. | 711/118 |
| 5,526,510 | * 6/1996 | Akkary et al. | 711/133 |
| 5,553,265 | * 9/1996 | Abato et al. | 711/143 |
| 5,644,752 | * 7/1997 | Cohen et al. | 711/122 |
| 5,680,572 | * 10/1997 | Akkary et al. | 711/126 |
| 5,765,190 | * 6/1998 | Circello et al. | 711/118 |

* cited by examiner

Primary Examiner—Eddie P. Chan
Assistant Examiner—T. V. Nguyen

(57) ABSTRACT

A most recently used bit (25) is used to determine if a data transfer should occur from a fill buffer (20) into a data memory (32) in a cache (15). If the data to be displaced in the data memory (32) has been referenced more recently than the data present in the fill buffer (20), then the transfer should not occur. When a cache miss does occur, a control register (50) is used to determine the conditions for loading the fill buffer (20).

14 Claims, 3 Drawing Sheets

| CACR[1] | CACR[0] | RESULT |
|---|---|---|
| 0 | 0 | LINE FILL AT 0,4,8; LONGWORD AT C |
| 0 | 1 | LINE FILL AT 0,4; LONGWORD AT 8,C |
| 1 | 0 | LINE FILL AT 0; LONGWORD AT 4,8,C |
| 1 | 1 | LONGWORD AT 0,4,8,C |

*TABLE 1*

APPARATUS AND METHOD FOR OPTIMIZING PERFORMANCE OF A CACHE MEMORY IN A DATA PROCESSING SYSTEM

CROSS REFERENCE TO A RELATED PATENT

This patent is related to our commonly assigned U.S. Pat. No. 5,765,190, entitled "IMPROVED CACHE MEMORY IN A DATA PROCESSING SYSTEM" by Joseph C. Circello et al.

FIELD OF THE INVENTION

This invention relates, in general, to data processing systems, and more particularly, to a data processor having a cache memory.

BACKGROUND OF THE INVENTION

In general, data processing systems comprise a central processing unit (CPU) that executes instructions that are fetched from a main memory. One method to improve the performance of the CPU is to use cache memory. Cache memory is high speed memory that works in conjunction with the CPU and the main memory to provide the necessary data to the CPU. With this architecture, a higher response time is possible than if the CPU fetches all instructions and operands directly from main memory.

The improved performance is possible because the cache contains the data that the CPU is most likely to request in the next bus cycle. The cache is typically also much faster than the main memory, therefore, the cache can usually provide the data required by the CPU much faster than the main memory. Part of the methodology used to load data into the cache is to predict and store the data that is frequently used by the CPU and is likely to be used by the CPU in the next bus cycle. When the cache contains data requested by the CPU, this is referred to as a cache hit.

However, it is not always possible to predict and store the necessary data in the cache before the CPU requests the data. If the cache does not contain the information requested by the CPU, then this is referred to as a cache miss. On a miss, the data is loaded from the main memory into a fill buffer and is provided to the CPU. On the next miss, the data in the fill buffer is then generally loaded into the cache in anticipation that the CPU may request the data in an upcoming bus cycle. This process continues throughout the operation of the processor.

During each cache miss, the data in the fill buffer is loaded into the cache. The transfer from the fill buffer into the cache may overwrite a valid piece of data in the cache. The data that is overwritten, however, may be the data that is requested by the CPU on the next bus cycle. In such a situation, on the next bus cycle the cache will be requires to fetch the data that was just overwritten in the previous cycle. Such situations reduce the efficiency of the use of a cache.

The loss in efficiency is further compounded by the time it takes to fill the fill buffer with data from the main memory. To increase the likelihood of a hit on the next bus cycle, it is common for the fill buffer to be filled with a large data stream such as 4 long words, which is 128 bits of data. However, if the next bus cycle only requires 16 or 32 bits of data, then most of the time spent to load the entire 128 bits is wasted.

By now it should be appreciated that it would be advantageous to provide an apparatus and method for improving the efficiency of a cache.

DETAILED DESCRIPTION OF THE INVENTION

The present invention provides a method and apparatus for improving the efficiency of a cache used in conjunction with a data processing system. The first aspect of this method is an improved process for transferring missed data values from a fill buffer into a data memory in the cache. This method improves the likelihood of a cache hit by the processor by only storing the most recently used data in the cache. The second method and apparatus is directed towards improving the process used to store the missed data value in the fill buffer. To optimize the performance of the cache, the fill buffer only needs to store the data that is likely to be used by the processor in the near future. This second method uses a control register to reduce the wasteful storing of unused data in the fill buffer.

Figure 1:
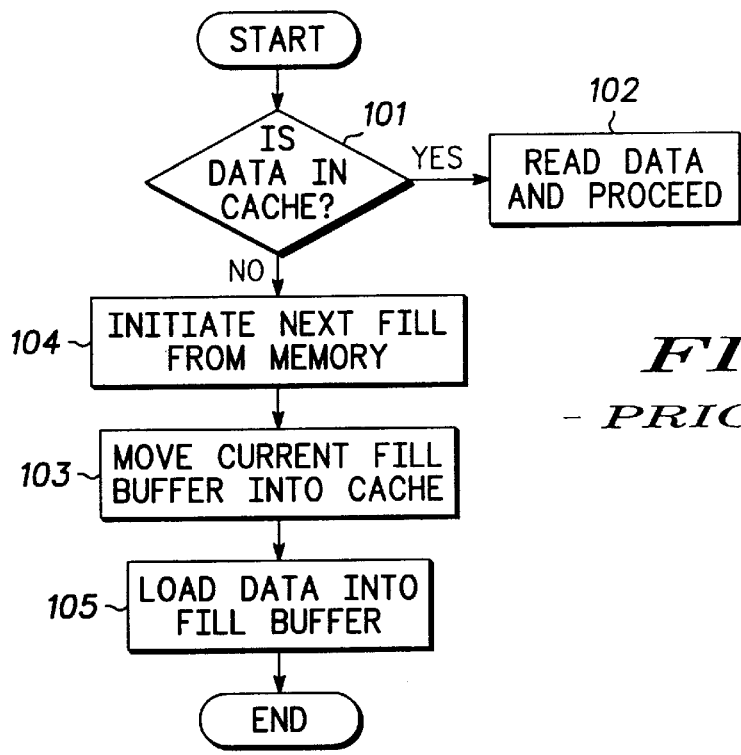
FIG. 1 illustrates a flow chart for a prior method for operating a cache.

FIG. 1 is a flow chart and is provided to briefly describe the operation of previously known techniques for operating a cache in conjunction with a data processing system. This narration is provided to demonstrate the wastefulness of this technique and to illustrate the improvement that is possible with the invention provided hereafter. The cache is intended to store and provide data that will be required by a processor in an upcoming bus cycle. To start, the processor generates a request for a data value by providing a processor address. The processing system then determines if the data referred to by the processor address is stored in the cache, box 101. If the data is in the cache, box 102, then this cycle is a 'hit' of the cache and the processor can proceed with the data requested. If the data required by the processor is not in the cache, then this is considered a cache 'miss' and the data required by the processor is loaded from an auxiliary memory source, box 104.

With the first occurrence of a miss, the data referred to by the processor address is fetched from the auxiliary memory source and stored in a fill buffer. The data stored in the fill buffer is referred to as a missed data value and it contains the data requested by the processor. In addition, the missed data value may also contain data that is loaded from the auxiliary memory source in anticipation of being used by the processor. With the second occurrence of a cache miss, the missed data value is transferred into cache, box 103, and then the fill buffer is loaded with the new missed data value requested by the processor, box 105. The new missed data value is once again loaded from the auxiliary memory source. With each subsequent miss by the processor, the missed data value is transferred from the fill buffer into the cache and the new missed data value requested by the processor is stored in the fill buffer. As data is transferred from the fill buffer into the cache, there is the possibility that previous data mapped in the cache will be displaced. This action can lower overall performance if the displaced data is referenced by the processing system in a subsequent access. Since the displaced data is no longer mapped in the cache, a subsequent reference will generate another cache miss and the data must be refetched from the auxiliary memory source.

A simple example is provided here to further illustrate the inefficiency of the technique shown in FIG. 1. First the processor requests a data value which will be referred to as "Data A". Since the cache does not contain "Data A", the value of "Data A" is loaded into the fill buffer. On the next bus cycle the processor requests "Data B". Again the cache does not contain "Data B" so the value of "Data A" is loaded into the cache and "Data B" is loaded into the fill buffer. On the next cycle the processor requests again "Data A" which is stored and is provided by the cache. On the next bus cycle the processor requests "Data C". Since "Data C" is not in either the cache or the fill buffer, "Data B" is transferred to the cache ("Data A" is then lost) and "Data C" is loaded into the fill buffer.

Figure 2:
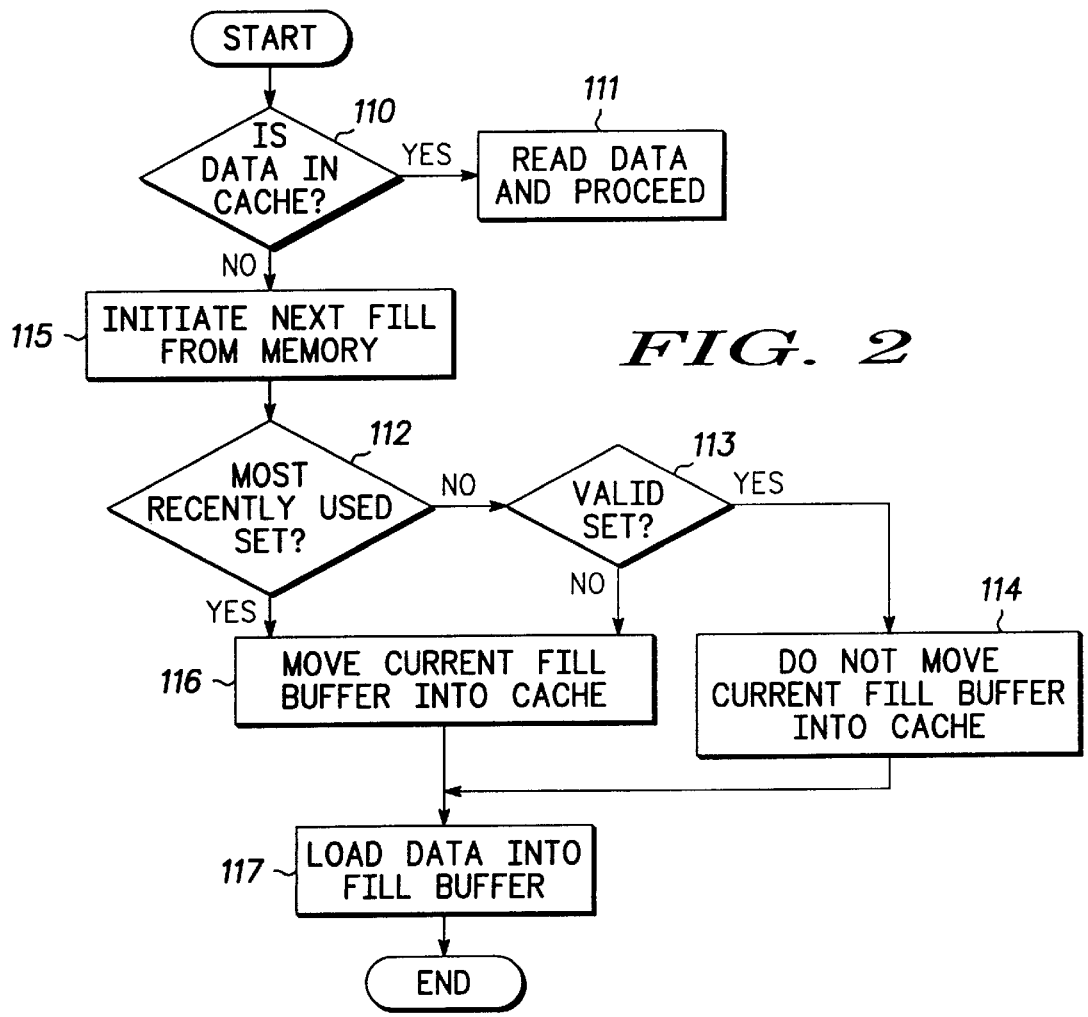
FIG. 2 illustrates a flow chart for operating a cache in accordance with the present invention.

If on a subsequent bus cycle "Data A" is again requested, then a fetch to the auxiliary memory is required to load the fill buffer with the value of "Data A". Therefore, in this example, an inefficiency was created when "Data B" was transferred into the cache thus erasing the stored value of "Data A". With each transfer from the fill buffer into the cache, a data value may be displaced that could be requested by the processor on an upcoming bus cycle. The additional fetching to restore the displaced data adds costly processing time to the data processing system Referring now to FIG. 2, an overview of the present invention will be provided to illustrate the differences of the present invention when compared to the previously known technique of FIG. 1. Like above, if the requested data is in the cache, box 110, then the processor proceeds with the data, box 111. If the data is not in the cache, then a cache miss begins by requesting the data from a main memory, box 115. As shown in the flow chart of FIG. 2, the present invention differs from previously known techniques in that the missed data value is not indiscriminately moved from the fill buffer into the cache during a cache miss. Instead, the present invention determines first if the data in the cache that is about to be displaced has been used more recently than the data in the fill buffer, box 112. By making this determination, the present invention prevents the displacement of data in the cache that may be used more often than the data stored in the fill buffer. This eliminates the needless loss of the data in the cache and prevents the wasteful time necessary to reload the data from the auxiliary memory if the data in the cache had been displaced.

The present invention also determines if the data stored in the cache is valid, box 113. If the relevant location in the cache does not contain any valid data, then the data from the fill buffer is loaded into the cache, box 116, without risk of displacing any potentially valuable data. In summary, if the data in the cache is valid and has been referenced more recently than the data value in the fill buffer, then the contents of the fill buffer are not transferred in to the cache, box 114. Conversely, if the data value in the cache is invalid or if the data value in the fill buffer has been referenced more recently than the data value in the cache, then the contents of the fill buffer are moved into the cache, box 116, upon the next cache miss. Each cache miss ends with the requested data being loaded into the fill buffer, box 117.

A more detailed description of an implementation of the present invention will now be provided. In the following description, the terms "assert" and "negate," and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state. In the following description, the term "bus" will be used to refer to a plurality of signals or conductors, which may be used to transfer one or more various types of information, such as data, addresses, control or status. Furthermore, the symbol "$" preceding a number indicates that number is represented in its hexadecimal or base sixteen form. The symbol "%" preceding a number indicates that number is represented in its binary or base two form.

Figure 3:
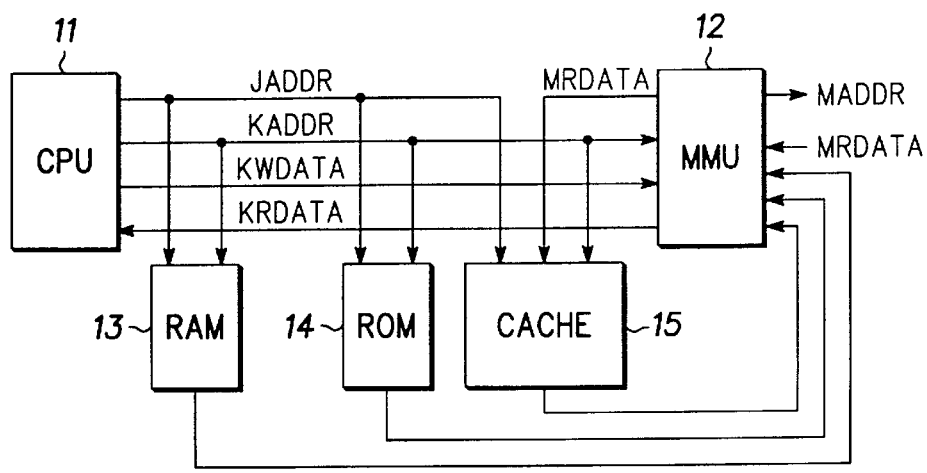
FIG. 3 is a block diagram of a data processing system used to illustrate an application for the present invention.

FIG. 3 is a block diagram representation of an application of a data processing system 10 employing a cache 15 in accordance with the present invention. It should be understood that in the following embodiments a data cache is referred as an example of a cache, however, the present invention is applicable to a variety of caches that are used to store data, instructions, parts of data, parts of instructions, or a combination thereof, namely a data cache, an instruction cache, or a unified cache. The embodiments of the present invention provide a cache that can be used with a variety of data processors or data processing systems such as micro-controllers, micro-processors, or the like.

As shown in FIG. 3, data processing system 10 comprises a data processor, a central processing unit, or a CPU 11, a memory management unit or an MMU 12, a random access memory or a RAM 13, a read only memory or a ROM 14, and a cache 15. It should be understood that the use of RAM 13, ROM 14, and MMU 12 may be optional and are not required to appreciate the benefits of the present invention. CPU 11 is coupled to data processing system 10 with a variety of buses used to pass address and data signals, namely a KADDR bus, a JADDR bus, a KWDATA bus, and a KRDATA bus. The KADDR bus and the JADDR bus are used by CPU 11 to generate or provide a processor address during each bus cycle. During any given bus cycle, the KADDR bus transports the processor address that refers to the memory location requested by CPU 11. The JADDR bus transports a portion of the processor address that is likely to be used during the next bus cycle and is used to provide a look-ahead mechanism for circuits coupled to CPU 11.

MMU 12 is coupled to CPU 11 by the KADDR bus, the KRDATA bus, and the KWDATA bus. Data requested by CPU 11 is passed from MMU 12 to CPU 11 using the KRDATA bus. Data to be sent by CPU 11 travels on the KWDATA bus to MMU 12. MMU 12 determines if the processor address on the KADDR bus is referring to RAM 13, ROM 14, cache 15, or to an auxiliary memory source (not shown). For example, during an instruction sequence CPU 11 places a processor address on the KADDR bus. MMU 12 then determines that the processor address is referring to a location in cache 15 and MMU 12 enables cache 15 so that cache 15 can provide the data requested. If the data requested is in cache 15, indicating a cache hit, then the requested data value is passed to CPU 11 through MMU 12 using the KRDATA bus.

If the data requested is not in cache 15, in other words a cache miss has occurred, then MMU 12 uses a MADDR bus and a MRDATA bus to retrieve the data from the auxiliary memory and store the data in a fill buffer in cache 15. A further description of the fill buffer and the process used to transfer data will be provided below.

Figure 4:
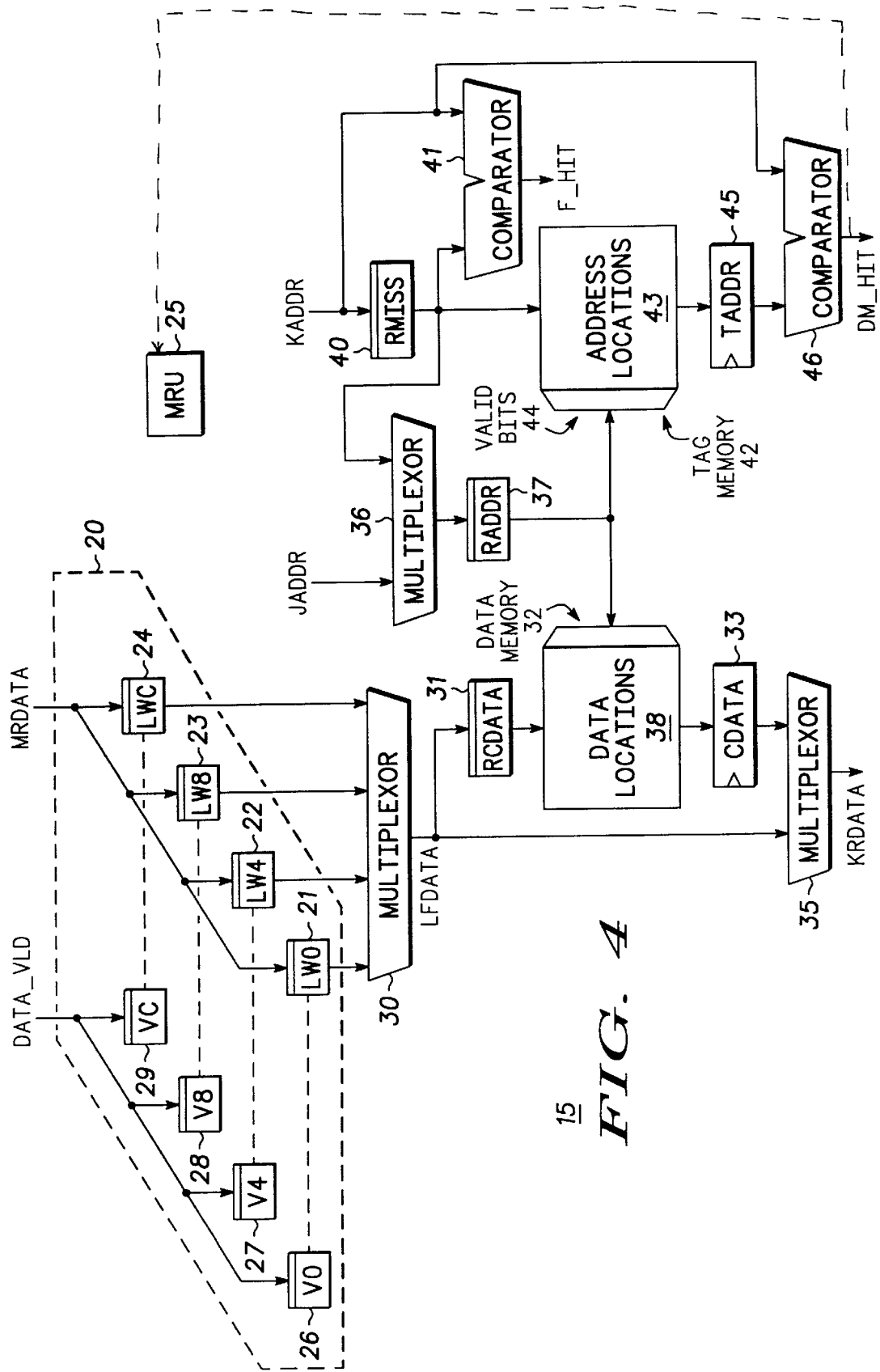
FIG. 4 is a block diagram of a cache in accordance with the present invention.

Turning now to FIG. 4, a detailed description of cache 15 will be provided. FIG. 4 is a block diagram representation of some of the elements that make up cache 15. As shown in FIG. 4, cache 15 comprises a data memory 32 and a TAG memory 42. TAG memory 42 comprises a plurality of address locations 43, and data memory 32 comprises a plurality of data locations 38. Each address location 43 in TAG memory 42 is used to store an address value. The address value stored in each address location 43 corresponds to all or part of the processor address generated by CPU 11. Each data location 38 in data memory 32 is used to store a data value associated with the corresponding address location 43 contained in TAG memory 42. Thus, TAG memory 42 provides a table associating address locations 43 with specific cache addresses. The data value associated with a given address location 43 is stored in data memory 32. Cache 15 is a direct mapped cache meaning that each address location 43 of TAG memory 42 directly refers to a predetermined data location 38 in data memory 32. A plurality of valid bits 42 is used to indicate if the data value stored in each particular data location 38 is valid or invalid.

Cache 15 also comprises a line fill buffer or a fill buffer 20, which is a register used to store a missed data value when a cache miss occurs. The missed data value is stored in registers or segments 21–24, which are labeled LW0, LW4, LW8, and LWC respectively. Each of segments 21–24 is coupled to a corresponding valid bit register 26–29, labeled V0, V4, V8, and VC, respectively, which indicates if the data stored in each of segments 21–24 is valid. The data value stored in segments 21–24 is loaded from data provided by an auxiliary memory and is transferred to fill buffer 20 using the MRDATA bus. As each of segments 21–24 is loaded with valid data, a DATA_VLD signal is used to set each of valid bits 26–29 in fill buffer 20.

Connected to fill buffer 20 is a multiplexor 30, which is used to select from segments 21–24 to provide a data value labeled LFDATA. The LFDATA data value is stored in a register 31, labeled RCDATA, and is also passed to a multiplexor 35. Multiplexor 35 is used to select whether the data value of LFDATA or a data value read from data memory 32 and stored in a storage element 33, labeled CDATA, is passed to the KRDATA bus.

Cache 15 also comprises a register 40, labeled RMISS, that is coupled to the KADDR bus and provides a address value, RMISS, to a comparator 41 and a multiplexor 36. The address value RMISS contains all or part of the processor address that generated the last miss of cache 15. As such, it represents the address corresponding to the data value stored in fill buffer 20. Comparator 41 compares the RMISS address value to the current value of the processor address on the KADDR bus and generates a signal labeled F_HIT. Multiplexor 36 is used to load a register 37, labeled RADDR, with either the RMISS address value when the contents of the fill buffer are written into the cache or a processor address on the JADDR bus for normal cache access cycles.

The RADDR address value is decoded to select the corresponding address location 43 in TAG memory 42 and data location 38 in data memory 32 that is referred to by the processor address. In the preferred embodiment, the RADDR address value is only a portion of processor address and only contains enough bits such that each address location 43 in TAG memory 42 can be individually selected (i.e., referenced). For example, if TAG memory 42 contains four separate address locations 43, then the RADDR address values needs to contain at least two bits (i.e. $2^2=4$). Since cache 15 is a direct mapped cache, the RADDR address value is also used to select the corresponding data location 38 in data memory 32. Since the RADDR address value is only a portion of the full processor address, there will be several processor addresses that correspond to the same address location 43 in TAG memory 42. For example, processor addresses $1100 and $2100 may both provide the same RADDR address value so both processor addresses refer to the same address location 43 and data location 38 in cache 15.

Connected to TAG memory 42 is a latch or storage element 45, labeled TADDR, which stores the address value contained in the address location 43 in TAG memory 42 that is referred to by the RADDR address value. A comparator 46 compares the TADDR address value to the processor address on the KADDR bus and generates a signal labeled DM_HIT based on the results of the comparison. One feature of cache 15 is that only the portion of the processor address necessary to provide the RADDR address value is needed to read a data value from data memory 32. Since the JADDR bus contains a portion of the processor address to be used on the next bus cycle, it is possible for cache 15 to begin reading the data value from data memory 32 before the data value is actually requested by CPU 11. Using the address value RADDR, the corresponding address value and data value are loaded into storage element 45 and storage element 33, respectively. This can occur independently of other operations in cache 15. Once the appropriate values are stored in storage element 45 and storage element 33, other portions of cache 15 will determine the appropriate use for those values as will be explained shortly.

Cache 15 further comprises a most recently used bit 25, labeled MRU. Most recently used bit 25 is a register used to provide a state or state value to indicate if a data value contained in line fill buffer 20 or a data value in data memory 32 is more recently used. Recall the contents of fill buffer 20 are transferred into the cache at the time of the next cache miss only if certain conditions are satisfied. The missed data value stored in fill buffer 20 would be placed into data memory 32 on the next cache miss, and the exact data location 38 to be used is dependent on the RMISS address value. However, the data location 38 referred to by the RMISS address value may already contain a valid data value. Therefore, most recently used bit 25 is used to indicate if the data value in the data location 38 referenced by the RMISS address value has been used by CPU 11 more recently than the missed data value stored in fill buffer 20. This prevents the needless loss of the data value stored in data memory 32. This also allows cache 15 to contain the data values that are more likely to be requested by CPU 11 in upcoming bus cycles.

In the preferred embodiment, most recently used bit 25 is asserted when the data contained in fill buffer 20, the missed data value, has been requested by CPU 11 more recently than the corresponding location in data memory 32. It should also be understood that whether most recently used bit 25 is either asserted or negated, or if most recently used bit 25 indicates if fill buffer 20 or data memory 32 is more recently used, is simply a matter of convention. The present invention can be modified so that cache 15 operates under any of these definitions.

Still referring to FIG. 4, a method of operating cache 15 will now be provided to further illustrate the advantages of the present invention. In this method, a sequence of bus cycles will be described to demonstrate the conditions for transferring the missed data value from fill buffer 20 to data memory 32. To begin, all data locations 38 in data memory 32 have been filled with valid data values, all corresponding address locations 43 have been filled, and all valid bits 44 in TAG memory 42 have been set. In this example, data memory 32 contains three data locations 38. The first of these can be referenced with addresses $1100, $2100, or $3100. The second location can be referenced with addresses $1200, $2200, or $3200. The third location can be referenced with addresses $1300, $2300, or $3300.

A first bus cycle begins with CPU 11 placing a first processor address, $1100, on the KADDR bus. A portion of the first processor address was placed on the JADDR bus during the previous bus cycle and is stored in register 37 to provide the RADDR address value. The RADDR address value is decoded and the appropriate data location 38 and address location 43 are referenced and the data values contained therein are loaded into storage elements 33 and 45, respectively.

Comparator 41 compares the RMISS address value, currently invalid, to the processor address on the KADDR bus. Since they are not equal, the F_HIT signal is negated to indicate that fill buffer 20 does not contain the data requested by CPU 11. The data requested is instead stored in data memory 32. Comparator 46 compares the TADDR address value to the processor address on the KADDR bus and determines that the appropriate portions are equal to indicate that they both refer to the address $1100. Comparator 46 asserts the DM_HIT signal to indicate that the requested data is stored in data memory 32. When this signal is asserted, the data value stored in storage element 33, CDATA, is allowed to pass onto the KRDATA bus to complete the first bus cycle.

The second bus cycle begins with CPU 11 generating a second processor address, $1200, which is not currently mapped in cache 15. A portion of this address is stored in register 37 to provide the RADDR address value so that the appropriate values can be loaded into storage elements 33 and 45. Since the second processor address is not stored in cache 15, comparator 46 will determine that the TADDR address value and the value on the KADDR bus do not match. Therefore, DM_HIT will be negated to prevent the data value in CDATA from passing to the KRDATA bus.

Since the second processor address is not in cache 15, a portion of the second processor address is stored in register 40, RMISS. MMU 12 (see FIG. 3) will generate the appropriate signals to load fill buffer 20 using data from an auxiliary memory (not shown). In the preferred embodiment, a line of data containing four long words (128 bits) is loaded into segments 21–24 with one long word stored in LW0, LW4, LW8, LWC, respectively. As each segment 21–24 is filled, a DATA_VLD signal is used to assert each of the corresponding valid bits 26–29. Once the missed data value is stored in fill buffer 20, most recently used bit 25 is asserted to indicate that fill buffer 20 contains a data value more recently used than a data location 38 that is also referenced by a similar address such as $2200 or $3200. Note, addresses $1200, $2200, and $3200 would all reference the same data locations 38 in cache 15.

A third bus cycle begins with CPU 11 generating a third processor address, $1300, that is also not in cache 15. Comparator 46 will negate the DM_HIT signal to indicate that the data requested is not in data memory 32. Comparator 41 will negate the F_HIT signal to indicate that the third processor address is not the same address as the last cache miss, therefore, the requested data is not in fill buffer 20 as well. Since most recently used bit 25 is still asserted, this indicates that the data in fill buffer 20 has been used more recently than the address location 43 in TAG memory 42 that is referenced with address $1200, $2200, or $3200. The address of the missed data value, $1200, is still stored in register 40, RMISS. Multiplexor 36 selects the RMISS address value so that it is stored as the RADDR address value. The RADDR address value then decodes the second address location in data memory 32 and the missed data is transferred from fill buffer 20 into data memory 32. The RMISS address value is then passed into the appropriate address location in TAG memory 42.

Still in the third bus cycle, MMU 12 fetches the data from the auxiliary memory and stores the value in fill buffer 20. The RMISS address value is updated to refer to the third processor address, $1300, and most recently used bit 25 is asserted to indicate that fill buffer 20 contains data more recently used than the data in data memory 32 (i.e. the address location referred to by $2300 or $3300).

The fourth bus cycle begins with CPU 11 generating a fourth processor address, $1300. This is the same processor address used in the third bus cycle. The requested data is not yet stored in data memory 32, but rather the requested data is present in fill buffer 20. During the fourth bus cycle, comparator 46 will negate DM_HIT indicating that the fourth processor address is not in data memory 32. This will prevent the data stored in storage element 33, CDATA, from passing onto the KRDATA bus. Comparator 41 will determine that the fourth processor address is equal to the RMISS address value, the last cache miss address, and assert the F_HIT signal. This will allow cache 15 to provide CPU 11 with the requested data using fill buffer 20. Since fill buffer 20 is more recently used than the third data location referenced by the address $1300, most recently used bit 25 remains asserted and the fourth bus cycle ends.

A fifth bus cycle begins with CPU 11 generating a fifth processor address, $2300. The fifth processor address is in data memory 32 and refers to the same data location 38 that is referred to by the processor address $1300. Since the requested data is in data memory 32, comparator 46 will assert the DM_HIT signal. This will allow the data value of CDATA to pass onto the KRDATA bus. Although the fifth processor address, $2300, is similar to the RMSS address value of $1300, comparator 41 will still negate F_HIT to indicate that the requested data is not present in fill buffer 20. If the contents of fill buffer 20 were to be moved into data memory 32, the missed data value would be put in the same data location 38 that was just used to provide the requested data in the fifth bus cycle. Therefore, since the data stored in data memory 32 has been used more recently than the missed data value in fill buffer 20, most recently used bit 25 is negated.

A sixth bus cycle begins with CPU 11 generating a sixth processor address, $3200, which is not in cache 15. Unlike the transfer of the fourth bus cycle, the missed data value is not transferred from fill buffer 20 into data memory 32 because most recently used bit 25 is not asserted. Therefore, the more recently used data in data memory 32, $2300, is protected from being displaced in anticipation that it will again be requested by CPU 11 more likely than the value in fill buffer 20. Instead, the sixth processor address, $3200, is stored as the RMISS address value and MMU 12 is used to provide the requested data and place a new missed data value in fill buffer 20. The new missed data value corresponds to the data of processor address $3200. Before the completion of the sixth bus cycle, most recently used bit 25 is asserted to indicate that the new missed data value is more recently used by CPU 11 than the data in data memory 32.

A seventh bus cycle begins with CPU 11 generating a seventh processor address, $2300. Since this data value was not lost by transferring the contents of fill buffer 20 in the sixth bus cycle, the data is still in data memory 32. Comparator 46 will assert the DM_HIT signal and the data will be provided to the KRDATA bus. Because this reference to cache 15, address $2300, does not correspond to the same data location 38 as the contents of fill buffer 20, $3200, most recently used bit 25 is unchanged, i.e., it remains asserted. This is because the data value stored in the data location referenced by $2300 would not be displaced by the current contents of fill buffer 20 (i.e., RMISS refers to $3200).

If the previously known cache replacement methodology had been used in the above mentioned bus cycles, than the contents of fill buffer 20 would have been moved to data memory 32 during the sixth bus cycle. This would have lost the data that was requested in the seventh bus cycle. Therefore, instead of having the data requested by CPU 11 like the present invention, the cache would not have the requested data and a cache miss would occur. This additional cache miss degrades the optimization, and thus degrades the performance, of a cache using the previously known replacement technique compared the method of the present invention.

It should be understood that the addresses in the examples provided are meant to generally describe the operation of cache 15. They should not be used to determine the exact decoding used to reference the various components of cache 15.

Figure 5:
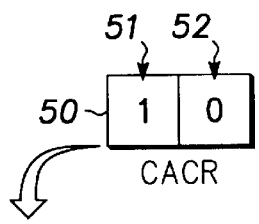
FIG. 5 is a diagram of a programmer's model of a register used in the operation of a cache in accordance with the present invention.

The performance of cache 15 can also be optimized with the use of a second feature of the present invention shown in FIG. 5. FIG. 5 is a block diagram and table used to describe the operation of a cache control register or a control register 50. Control register 50 is used to optimize the amount of data that is fetched and loaded into fill buffer 20 during each cache miss. In the following narration, control register 50 is used in conjunction with cache 15. It should be understood that control register 50 can be used with most caches including cache 15 of FIG. 4, but it is not limited to this particular application. It is possible to improve the performance of a cache memory with the use of control register 50 without the need for most recently used bit 25.

As described in the preferred embodiment of cache 15, fill buffer 20 stores a line comprising four long words (128 bits of data). In addition, each data location 38 in data memory 32 stores one long word of data (32 bits). In the second, third, and sixth bus cycles described above, a cache miss occurred and MMU 12 proceeded to load fill buffer 20 with 128 bits of data. However, each data request from CPU 11 only requires 32 bits or less of data (CDATA and LFDATA are 32 bit values). Therefore, even though CPU 11 only requires 32 bits of data, MMU 12 loads 128 bits into the cache memory. This is done in anticipation that CPU 11 will request some of the additional data stored in fill buffer 20 on a subsequent bus cycle. For example, if a cache miss occurs because CPU 11 requested a long word that is to be stored in segment 21 (LW0), MMU 12 anticipates that CPU 11 will request the sequential data stored in LW4, LW8, or LWC in an upcoming bus cycle.

In some applications, this may be true. However, the individual user of data processing system 10 does not have the ability to adjust the amount of data, or the conditions, for loading data into fill buffer 20. In other applications, CPU 11 may only need the long word stored in LW0 and will not need the data loaded into segments 22–24. As an example, consider the case where CPU 11 only needs the long word stored in LWC and does not reference the data loaded into segments 21–23. In this case, the efficiency of cache 15 can be optimized and overall system performance improved by eliminating the wasted time spent fetching the data to load segments 21–23 when only segment 24 needs to be loaded. This optimization is especially appropriate in designs where the width of the interface to the auxiliary memory is smaller than the 32-bit reference size, e.g., 8-bit or 16-bit interface. Simply stated, control register 50 gives a user of data processing system 10 the flexibility to decide how fill buffer 20 is loaded with data during a cache miss.

Referring now to FIG. 5, a more detailed description of the conditions or options for loading fill buffer 20, as the result of a cache miss, will be provided. Control register 50, labeled CACR, contains two bits, a first bit 51, referred to as CACR[1], and a second bit 52, referred to as CACR[0]. The exact number of bits 51–52 in control register 50 will depend on the number of options or conditions that are desired for loading fill buffer 20. It should be understood that it is possible to implement the present invention such that control register 50 has a single bit or a plurality of bits. The contents of CACR[1] and CACR[0] are chosen and set by the individual user of data processing system 10. A default state, such as CACR[1] and CACR[0] both set to 0, can be present if the user decides not to choose a particular condition.

Also shown in FIG. 5 is TABLE 1, which represents one possible implementation of the user selectable conditions or options for loading fill buffer 20. The four possible states of CACR[1] and CACR[0] are 00, 01, 10, and 11. Each one of these states represents a different procedure for loading fill buffer 20 in response to an address generated by CPU 22 not resident in cache tag memory 42 and data memory 32. In the event of a cache miss, bits 3 and 2 of the processor address is compared to the state defined in CACR[1:0] to determine the appropriate fetch size performed by MMU 12 from the auxiliary memory source. In all cases, the valid bit (V0 26, V4 27, V8 28, VC 29) is asserted if the corresponding data was fetched and loaded into fill buffer 20. If the appropriate data value was not fetched, the valid bit is negated.

For example, the first condition, CACR[1] and CACR[0] both 0, will fill all four long words (LW0, LW4, LW8, and LWC) in fill buffer 20 if the processor address refers to segments 21–23 (LW0, LW4, or LW8). If the processor address refers to segment 24 (LWC) then only a long word of data will be loaded into segment 24 (LWC) and no data will be loaded into the other segments 21–23. Therefore, if CPU 11 requests a data value that would be stored in LWC, then the assumption is that CPU 11 will not likely be requesting the data corresponding to LW0, LW4 or LW8 on an upcoming cycle so those locations in fill buffer 20 are not loaded with data. This improves the performance and efficiency of cache 15 because this condition saves the loading of three memory locations that will not be needed or used by CPU 11.

The second condition, CACR[1] and CACR[0] are 0 and 1, respectively, will fill all four long words (LW0, LW4, LW8, and LWC) in fill buffer 20 if the processor address refers to segments 21–22 (LW0, or LW4). If the processor address refers to segments 23 or 24 (LW8 or LWC) then only a long word of data will be loaded into segments 23 or 24 (LW8 or LWC) and no data will be loaded into the other segments 21–22. The assumption is that CPU 11 will not likely be requesting the data corresponding to LW0 or LW4 on an upcoming cycle so those locations in fill buffer 20 are not loaded with data.

The third condition, CACR[1] and CACR[0] are 1 and 0, respectively, will fill all four long words (LW0, LW4, LW8, and LWC) in fill buffer 20 if the processor address refers only to segment 21 (LW0). If the processor address refers to segments 22, 23, or 24 (LW4, LW8, or LWC) then only a long word of data will be loaded into segments 22,23, or 24 (LW4, LW8, or LWC) and no data win be loaded into the other segments.

The forth condition, CACR[1] and CACR[0] are both 1, will only fill the segment 21–24, referred to by the processor address, with a long word of data. Under no circumstances is the entire fill buffer 20 loaded with data. Depending on which of the above conditions is selected by the user, it is possible that only a portion of fill buffer 20 contains valid data from the last cache miss. The segments 21–24 that do contain valid data are indicated as such by using the appropriate valid bits 26–29. It should also be understood that the result or condition selected by CACR[1] and CACR[0] can be varied such that one of the conditions is a default value. The result of each condition can also be rearranged in TABLE 1 so different states of CACR[1] and CACR[0] will select a different result than that shown in TABLE 1.

The advantage of control register 50 and the various conditions that it provides is that the user of the data processing system can optimize the performance of cache 15 by selecting the best condition for loading fill buffer 20 with data. Various programs will have different trends in the order in which they request data. Therefore, one program might benefit from loading the entire fill buffer, whereas another program might be best suited if only one long word was loaded into the fill buffer on each cache miss. The present invention provides the flexibility to an end user to let them determine the best conditions for loading fill buffer 20 in their particular application.

By now it should be appreciated that the present invention provides a method for optimizing the performance of a cache memory in a data processing system. A first feature of the present invention uses a most recently used bit to determine if transferring a data value from a fill buffer into the cache is in the best interest of the performance of the processing system. A second feature gives the individual user of the data processing system the freedom to choose the conditions or procedure for loading the fill buffer with data. Both of these features can be used alone or in combination to improve the probability that a cache hit will occur and to minimize the delay time when ever a cache miss should occur.

We claim:

1. A data processing system having a cache, comprising:
   a data memory;
   a fill buffer for storing a missed data value, wherein the fill buffer comprises a number of segments; and
   a control register having at least one bit for storing a first state and a second state, wherein the control register determines the number of segments of the fill buffer used to store the missed data value and wherein only a portion of the segments of the fill buffer are used to store the missed data value when the bit is in the second state.

2. The data processing system of claim 1 wherein all of the number of segments of the fill buffer are used to store the missed data value when the bit is in the first state.

3. The data processing system of claim 1 wherein only one of the number of segments of the fill buffer is used to store the missed data value when the bit is in the second state.

4. The data processing system of claim 1 wherein the data processing system provides a processor address, the processor address corresponds to one of the number of segments of the fill buffer.

5. The data processing system of claim 4 wherein the processor address and the bit are used to determine if all of the number of segments of the fill buffer are used to store the missed data value.

6. The data processing system of claim 5 wherein the processor address and the bit are used to determine if only a portion of the number of segments of the fill buffer are used to store the missed data value.

7. The data processing system of claim 4 wherein the processor address and the bit are used to determine that only one of the number of segments of the fill buffer is used to store the missed data value.

8. The data processing system of claim 4 wherein the cache is a data cache, an instruction cache, or an unified cache.

9. A data processing system for generating a processor address and having a cache comprising:
   a data memory;
   a fill buffer having a plurality of segments for storing a missed data value, wherein the processor address refers to one of the plurality of segments; and
   a control register having a plurality of bits used in conjunction with the processor address to determine a number of the plurality of segments in the fill buffer to be filled with data for storing the missed data value, wherein when the plurality of bits are set in a first state, only a portion of the number of the plurality of segments is used to store the missed data.

10. The cache of claim 9 further comprising a plurality of valid bits each corresponding to one of the plurality of segments in the fill buffer, the plurality of valid bits indicate if each of the plurality of segments contains a valid data value.

11. A method for operating a cache in a data processing system, the cache having a fill buffer, wherein the fill buffer comprises a plurality of segments, a control register, and a data memory, and the method comprising the steps of:
   setting one or more bits in the control register indicating a condition for loading the fill buffer with a missed data value, wherein the one or more bits indicates how many of the plurality of segments are used to store the missed data value and wherein at least one state of the one or more bits indicates that only a portion of the plurality of segments are to be used to store the missed data value;
   generating a processor address that is coupled to the data processing system, wherein the processor address is not in the cache;
   loading the missed data value into the fill buffer; and
   wherein the condition used to store the missed data value in the fill buffer is further determined by the processor address.

12. The method of claim 11 wherein the fill buffer has a first segment and a second segment and the processor address refers to either the first segment or to the second segment, wherein if the processor address refers to the first segment, then both the first segment and the second segment are used to store the missed data value, and if the processor address refers to the second segment, then only the second segment is used to store the missed data value.

13. The method of claim 11 wherein the cache further comprises a plurality of valid bits and the fill buffer comprises a plurality of segments, and one of the plurality of valid bits is coupled to one of the plurality of segments.

14. The method of claim 13 wherein the step of loading the missed data value includes the step of setting the plurality of valid bits corresponding to the plurality of segments used to store the missed data value.

* * * * *